United States Patent [19]

McGuire et al.

[11] Patent Number: 4,623,296
[45] Date of Patent: Nov. 18, 1986

[54] ROBOT END EFFECTOR TO TRANSFER SHAPED PARTS

[75] Inventors: Kenneth J. McGuire, Sarver; John R. Dahlberg, Jeannette; Charles J. Hyatt, Cheswick, all of Pa.

[73] Assignee: PPG Industries, Inc., Pittsburgh, Pa.

[21] Appl. No.: 638,834

[22] Filed: Aug. 7, 1984

[51] Int. Cl.$^4$ ............................................. B65G 65/02
[52] U.S. Cl. ........................................ 414/730; 53/52; 53/542; 156/362; 294/64.1; 294/65; 294/907; 414/42; 414/786; 901/6; 901/7; 901/35
[58] Field of Search ............... 414/730, 732, 736, 737, 414/744 B, 752, 42, 786, 222, 225; 294/64.1, 65, 907; 901/6, 7, 40, 44, 45, 46, 47, 35; 156/99, 351, 362, 378; 53/52, 156, 542; 271/256, 258; 29/822-824

[56] References Cited

U.S. PATENT DOCUMENTS

| | | | |
|---|---|---|---|
| Re. 26,904 | 6/1970 | Lemelson | 414/730 |
| 1,959,216 | 5/1934 | Owen | 414/225 X |
| 2,049,850 | 8/1936 | Lytle, et al. | 414/730 X |
| 2,800,226 | 7/1957 | Drennan | 414/744 B |
| 2,838,898 | 5/1958 | Owen | 414/752 X |
| 3,178,041 | 4/1965 | Wheat | 414/107 |
| 3,194,417 | 7/1965 | Dunsmore et al. | 414/736 |
| 3,598,263 | 8/1971 | Ehmke | 414/737 X |
| 3,664,520 | 5/1972 | Parnet | 414/103 X |
| 3,679,076 | 7/1972 | Miller et al. | 414/730 |
| 3,682,329 | 8/1972 | Dean | 414/107 |
| 3,774,783 | 11/1973 | Miller et al. | 414/107 |
| 3,860,125 | 1/1975 | Johnson et al. | 414/564 |
| 4,065,001 | 12/1977 | Ohnaka | 414/737 |
| 4,200,420 | 4/1980 | Cathers et al. | 414/107 |
| 4,228,886 | 10/1980 | Moran | 198/395 |
| 4,228,993 | 10/1980 | Cathers | 271/236 |
| 4,299,533 | 11/1981 | Ohnaka | 414/752 |

*Primary Examiner*—Robert J. Spar
*Assistant Examiner*—Donald W. Underwood
*Attorney, Agent, or Firm*—Andrew C. Siminerio

[57] ABSTRACT

An end effector apparatus for attachment to an industrial robot for transferring prepressed windshields to an autoclave tub. Vacuum cups engage and secure the windshield to the end effector for transfer of the windshield from an upender conveyor to the tub. A combination spacer clip sensing device and spacer clip retaining device senses the presence of a spacer clip on the top edge of the windshield and holds the clip in place during transfer.

19 Claims, 11 Drawing Figures

ROBOT END EFFECTOR TO TRANSFER SHAPED PARTS

BACKGROUND OF THE INVENTION

I. Field of the Invention

This invention relates to an end effector for an industrial robot and, more specifically, to a robot end effector for handling windshields, and detecting the presence of a spacer clip on the edge of the windshield.

II A. Discussion of the Technology

Bent laminated windshields for automobiles are fabricated in a series of steps. First, pairs of glass sheets or doublets are placed on skeletal frames and passed through a heating furnace where they deform and sag as a pair to conform to a desired concave upward profile. The two sheets are bent as a pair so that their shapes complement each other throughout the entire extent of the glass sheets.

The next step involves inserting a flexible sheet of plasticized interlayer material e.g., a sheet of plasticized polyvinyl acetal resin, between each matched pair of bent glass sheets to form an assembly to be laminated. To avoid sliding of the glass sheets relative to each other prior to further fabrication operations, the assembly is thereafter heated and passed between one or more sets of nipper rolls to squeeze the heated assembly to force out any entrapped air between the layers.

To complete the adhesive bond between the thermal plastic interlayer and the glass sheets, the glass and plastic interlayer assembly is subjected to a final heating and pressing operation. One technique includes subjecting the assembly to heat and pressure while fully immersed in an autoclave. It is the usual practice to manually unload and place the windshield assembly in autoclave tubs in an upended position. The tubs are then transferred to the autoclave. Spacers are used on the upper edge of windshield assemblies to keep them separated while in the autoclave. The usual autoclave treatment utilizes temperatures of about 225° to 300° F. (107° to 149° C.), and simultaneously elevated pressure of approximately 175 to 225 lbs/sq. in. (1.2 to 1.5 megapascals) for a period of about 20 to 45 minutes.

II B. Presently Available Technology

Whereas the loading of the autoclave tub is generally accomplished manually, it would be more cost effective if the loading could be done automatically. The following patents illustrate the use of vacuum cups and platen to transfer articles such as glass sheets.

U.S. Pat. No. 2,049,850 to Lytle et al. discloses equipment designed to transfer glass sheets which are brought to the apparatus in a stacked upright position, to a horizontal position on a conveyor. Vacuum cups are mounted on a pivoting frame to engage and hold the glass sheet. The carriage moves back and forth along a track while the pivoting frame connected thereto pivots from an upright to a horizontal position.

U.S. Pat. No. 3,178,041 to Wheat discloses an apparatus for automatically handling individual glass sheets and properly stacking them for subsequent use. The apparatus has a plurality of spaced vacuum cups attached to an overhead swinging frame. The glass sheets are engaged by the vacuum cups, lifted off the horizontal conveyor, and swung into an upright position on bucks located on either side of the conveyor. The swing of the frame during successive loading passes varies to compensate for the increased thickness of the stack of sheets.

U.S. Pat. Nos. 3,679,076 and 3,774,783 to Miller et al., and U.S. Pat. No. 3,682,329 to Dean disclose apparatuses for receiving glass sheets from a horizontal conveyor and stacking them on edge. Sheets drop off the end of a horizontal conveyor and onto an angled vacuum platen which receives, aligns and moves the sheets to a stacking location where the sheet is unloaded in an upright position. In U.S. Pat. Nos. 3,679,076 and 3,774,783, the loading buck remains in a fixed location as the vacuum platen and conveyor index forward for each successive unloaded glass sheet, while in U.S. Pat. No. 3,682,329, the collector or stacker member moves backward with each sheet that is stacked.

The following patents illustrate the use of vacuum cups on the end of a manipulator.

U.S. Pat. No. 3,598,263 to Ehmke discloses an articulating device capable of handling large glass sheets which must be accurately positioned. Suction devices are placed around an adjustable frame to engage and support the glass sheet. The apparatus is capable of pivoting and rotating the position of the glass sheet to a desired position.

U.S. Pat. No. 4,065,001 to Ohnaka discloses a jointed manipulator with a vacuum cup at the end of the manipulator arm. The arm is capable of moving and pivoting along a various axis.

U.S. Pat. No. 4,299,533 to Ohnaka discloses a jointed manipulator for transferring objects, e.g., from a belt conveyor to a processor. The manipulator is constructed to have only one degree of freedom. The material holder has a series of suction cups to engage and support the object to be moved.

It would be desirable to have an apparatus that could automatically unload windshield assemblies from one conveyor and load them into an autoclave tub while also detecting the presence of a spacer clip on the assembly and signalling an operator if the spacer clip is missing.

SUMMARY OF THE INVENTION

This invention provides an end effector for a robot for transferring windshield assemblies with spacer clips located on an edge of the assemblies. The end effector has a main frame attached to the robot. A first set of flexible vacuum cups are attached to the main frame, while a second set of vacuum cups are mounted on a sliding frame that slides on the main frame for positioning the second set of cups. The vacuum cups engage a surface of the windshield assembly to secure it to the main frame. A clip retainer and a clip sensor are mounted on the sliding frame. The clip retainer which secures the spacer clip to the assembly includes a clip securing arm secured to an air cylinder mounted on the sliding frame. The arm is positioned such that when the air cylinder is in a first position the securing arm does not contact the clip, and when the air cylinder is in a second position, the securing arm contacts and holds the clip on the windshield assembly. The clip sensor which detects if a clip is on the windshield assembly includes a proximity switch mounted on the clip securing arm and positioned such that when the air cylinder is in the second position and the securing arm contacts the spacer clip, the proximity switch is in a position near the clip.

This invention also provides a method of loading windshield assemblies in an autoclave tub with a robot, the windshield assemblies being spaced apart by spacer clips along one edge. A clip retaining force engages the clip prior to transfer of the windshield and disengages the clip prior to depositing the assembly in the autoclave tub. Each successive windshield assembly is positioned in the autoclave tub at a point one spacer clip thickness short of the point where the preceding windshield assembly was unloaded. A spacer clip sensor senses whether a spacer clip is present on the windshield assembly and automatically alerts an operator if a spacer clip is missing.

DETAILED DESCRIPTION OF THE PREFERRED EMBODIMENT

Figure 1:
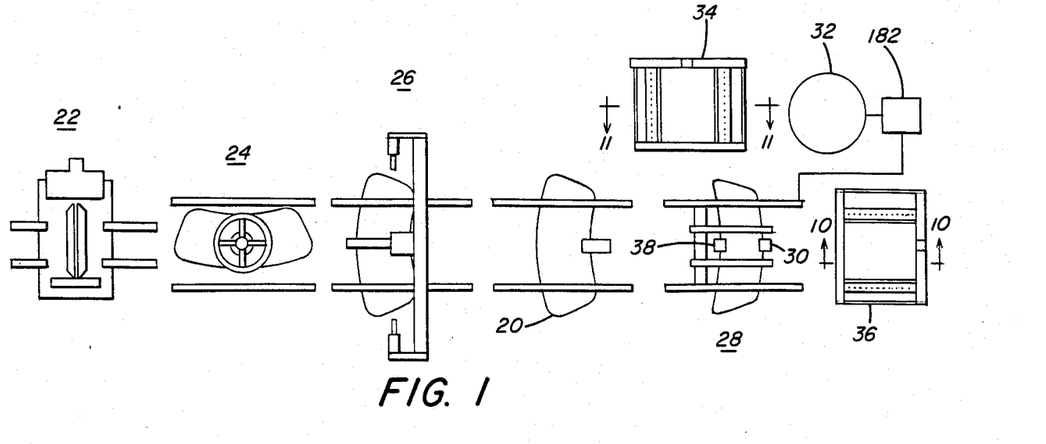
FIG. 1 is a plan view of a typical prepressed windshield unloading and autoclave tub loading line.

FIG. 1 illustrates a typical prepressed windshield unloading and autoclave tub loading line. Prepressed windshield assembly 20 is horizontally conveyed by any convenient means through a nipper roll station 22, to a turnaround station 24 where it is rotated 90°, to a squaring and button application (if required) station 26, and finally to a windshield upender conveyor 28, where it is lifted and supported in an upright position. The lower edge of the assembly 20 is positioned on stops 30 in order to establish a reference between the assembly 20, a robot 32 and autoclave tub 34. Additional autoclave tubs can be positioned at the robot 32, as illustrated by autoclave tub 36, to allow tub loading to continue uninterrupted when a tub is full. Although not limited to this invention, the glass is preferably conveyed to the upender conveyor 28 in a horizontal position and lifted to an angle of approximately 75° in the direction it is conveyed. At the upender conveyor 28, a dedicated robot (not shown) positions a spacer clip 38 on the top edge of the windshield 20. The robot 32 with an end effector 40 of this invention engages the assembly 20 at the upender conveyor 28 and moves it to the loaded position in autoclave tub 34 or 36. When fully loaded, the tubs 34 and 36 are immersed in an autoclave (not shown).

FIGS. 2 through 7 illustrate the preferred end effector 40 of this invention. Specifically referring to FIGS. 3 and 4, frame 42 is fixed to support members 44 and 46, preferably at an inclined position, by struts 48 and 50. Base plate 52 is rigidly attached to support members 44 and 46 and has a plurality of holes 54 for attachment of the end effector 40 to the wrist (not shown) of the robot 32. The support members 48 and 50 are reinforced by plate 56.

Figure 2:
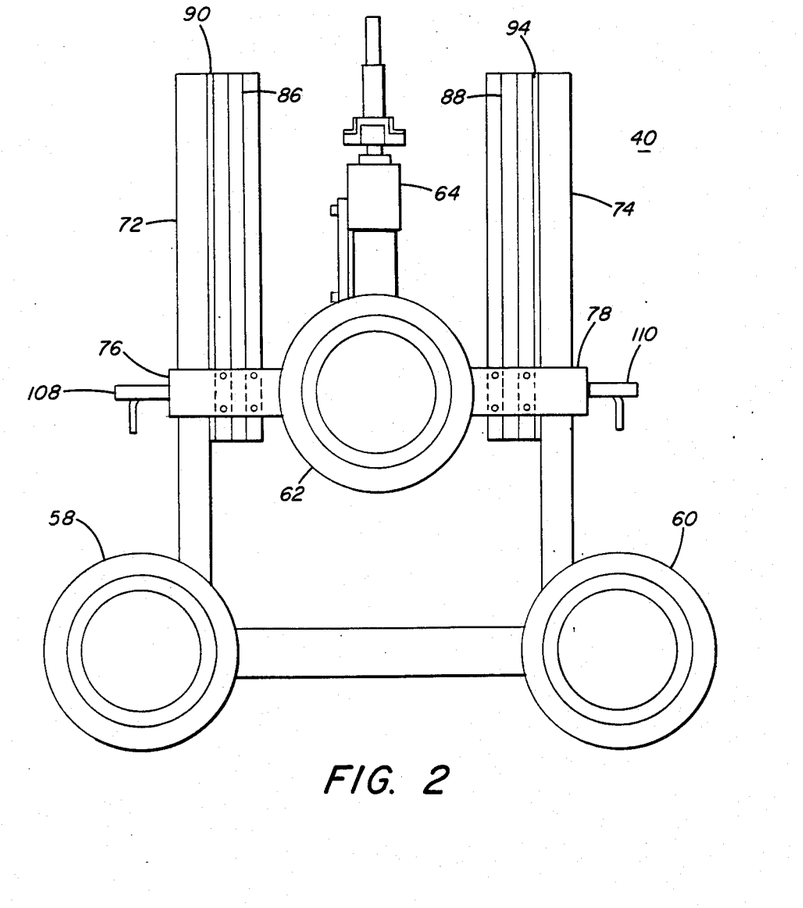
FIG. 2 is a front view of the preferred end effector incorporating the features of this invention.
Figures 3, 4:
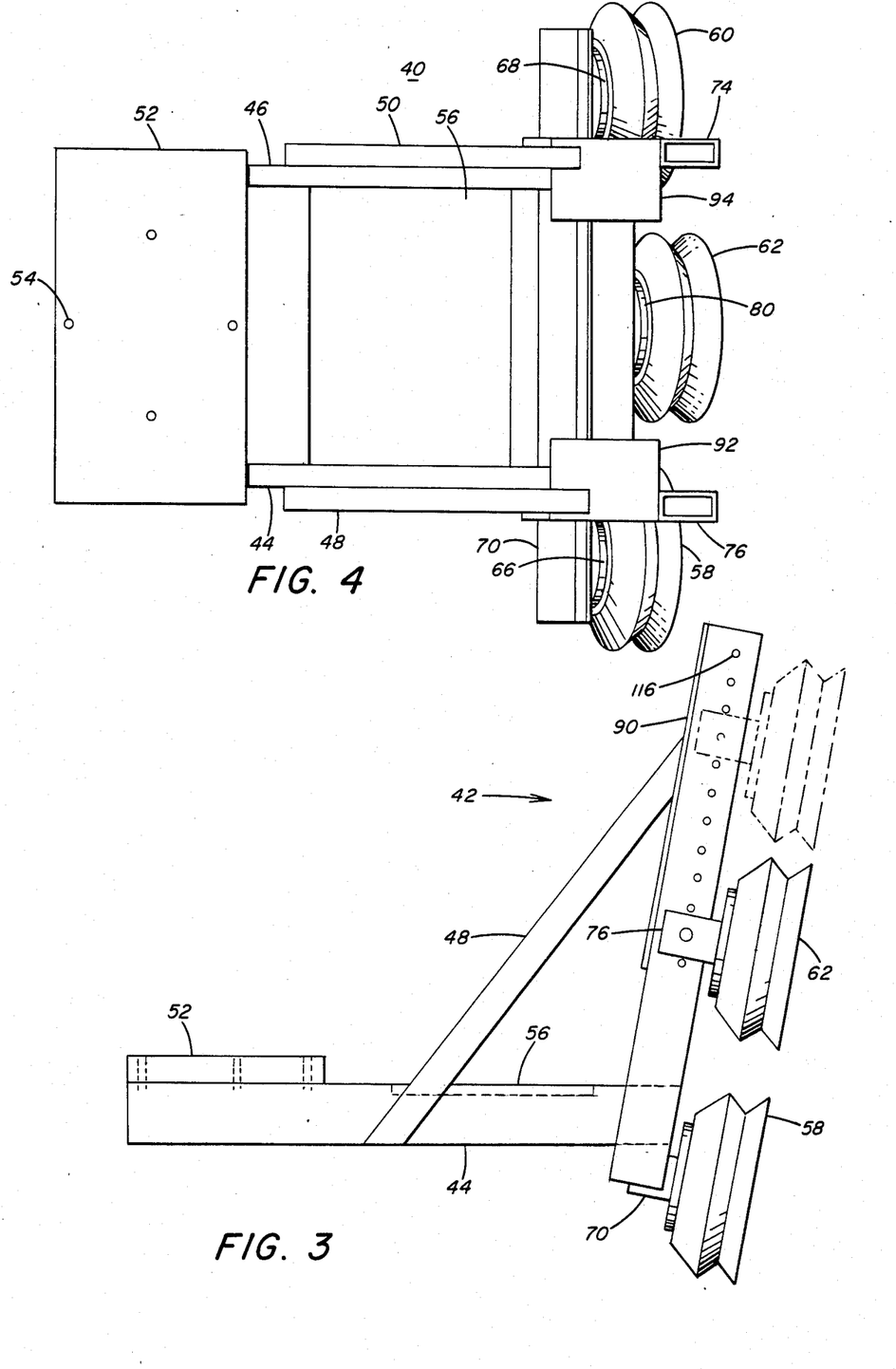
FIG. 3 is a side view of the end effector illustrated in FIG. 2.
FIG. 4 is a top view of the end effector illustrated in FIG. 2.

Referring now to FIG. 2, the frame 42 supports lower vacuum cups 58 and 60, upper vacuum cup 62 and spacer clip proximity sensor 64. The cups 58 and 60 are mounted to the frame 42 through backing plates 66 and 68, respectively, via cross angle member 70, which is fixed to frame tube members 72 and 74.

Figure 5:
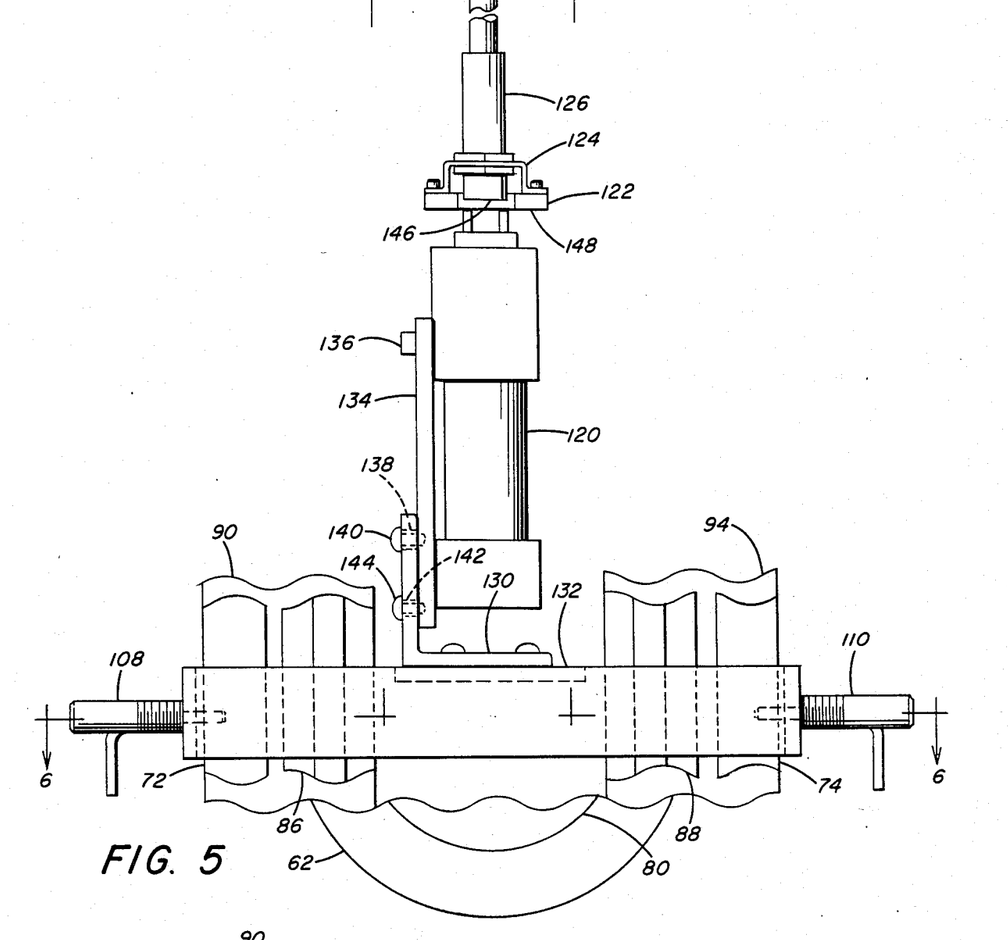
FIG. 5 is a rear view of the sliding frame.
Figure 6:
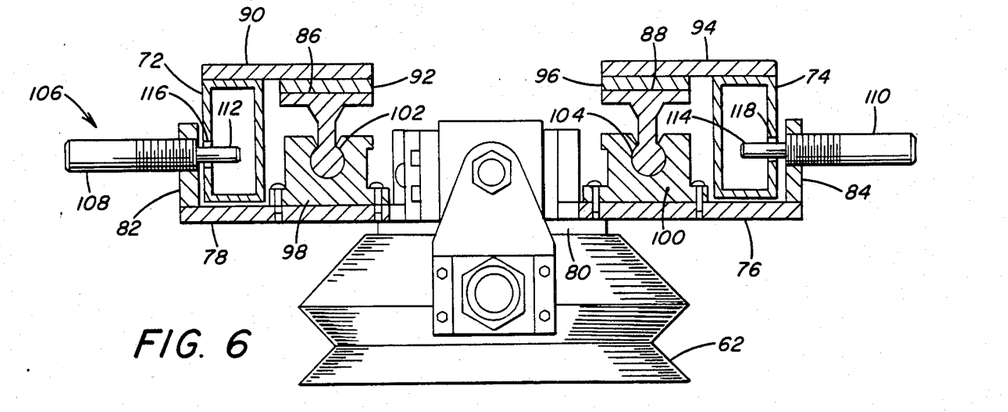
FIG. 6 is a view through line 6—6 of FIG. 5 with portions removed for clarity.

The vacuum cup 62 and spacer clip proximity sensor 64 are mounted on a sliding frame 76. As shown in FIGS. 5 and 6, the cup 62 is secured to plate 78 of the sliding frame 76 through backing plate 80. The plate 78 along with plates 82 and 84 connected to the ends of the plate 78 slidably jackets the frame 42. The sliding movement of the sliding frame 76 is guided by rails 86 and 88. The rail 86 is supportably mounted to the tube 72 through reinforcing plate 90 and mounting plate 92. Rail 88 is supportably mounted to the tube 74 through reinforcing plate 94 and mounting plate 96. Rail runner members 98 and 100 are fixed to the plate 78 and slidably engage head sections 102 and 104 of the rails 86 and 88, respectively. The sliding frame 76 is locked in position along the tube members 72 and 74 of the frame 42 by locking means 106. Although not limited to this invention, the locking means 106 is preferably a pair of spring-loaded locking pins 108 and 110 affixed to the side plates 82 and 84. Pin sections 112 and 114 can be retracted within the locking pins 108 and 110, respectively, and reinserted into any of a plurality of holes 116 and 118 along the tube members 72 and 74, respectively, as shown by the phantom line on FIG. 3

Figure 7:
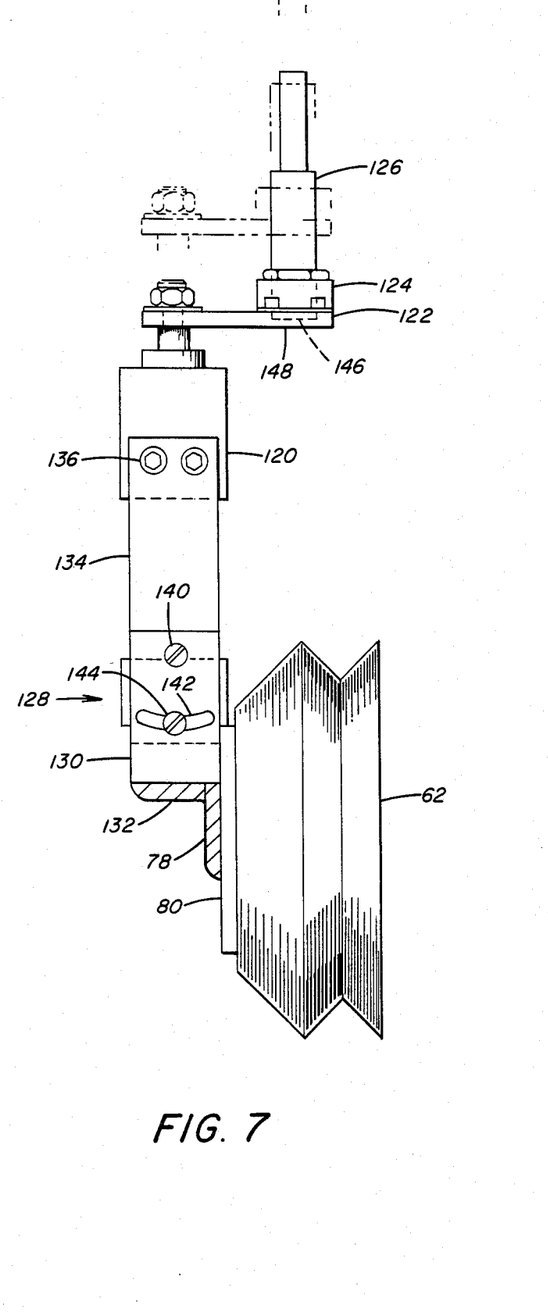
FIG. 7 is a side view of the sliding frame illustrating the upper vacuum cup and spacer clip proximity sensor.

Clip spacer proximity detector 64 has two functions. First, it detects whether or not each assembly 20 has the spacer clip 38 positioned on its upper edge. Second, since the spacer clip 38 tends to move along the edge of the assembly 20 when the assembly 20 is transferred by the robot 32, it holds the spacer clip 38 in place as the assembly 20 is moved from the upender conveyor 28 to the autoclave tubs 34 or 36. Although not limited to this invention, in order to perform these functions the spacer clip proximity detector 64 includes an air cylinder 120 connected through an arm 122 and mounting shoulder 124 to a proximity switch 126 as illustrated in FIGS. 5 and 7. The air cylinder 120 is tiltably mounted through tilting means 128 to support angle member 130. The angle member 130 is bolted to plate 132 which, in turn, is rigidly connected to the plate 78 of sliding frame 76. The tilting means 128 includes tilt plate 134 which is fastened to the air cylinder 120 by connector 136. The support angle member 130 has a hole 138 to receive fastener 140 and a slot 142 to receive fastener 144 to connect the tilt plate 134 to the air cylinder 120. The fastener 140 acts as a pivot point while the fastener 144 slides within the slot 142. When the spacer clip proximity detector 64 is in proper position to detect the presence of the spacer clip 38, as will be discussed later in greater detail, the fastener 144 is tightened to hold the assembly in place.

As illustrated in FIGS. 5 and 7, lower face 146 of the proximity switch 126 is fixed in a spaced relationship above lower surface 148 of the arm 122. During operation, the air cylinder 120 moves the arm 122 from a first position shown by phantom lines on FIG. 7, to a contact position to hold the spacer clip 38 in position on the assembly 20, while the proximity switch 126 is positioned close to but not in contact with spacer clip 38. The movement of the arm 122 via the air cylinder 120 is such that if the space clip 38 is missing, the arm 122 will stop short of directly contacting the assembly 20. Although not limited in the invention, proximity switch 126 is preferably an inductive sensor that generates a sensing field to detect whether or not the spacer clip 38 is in place and can activate an alarm (not shown) to notify an operator if the spacer clip 38 is not present. The operation of this type of proximity switch is well known in the art and will not be discussed further. Although in the preferred embodiment the proximity switch 126 is a non-contact inductive sensor, any type of sensing swtich could be used to detect the spacer clip 38.

Figure 8:
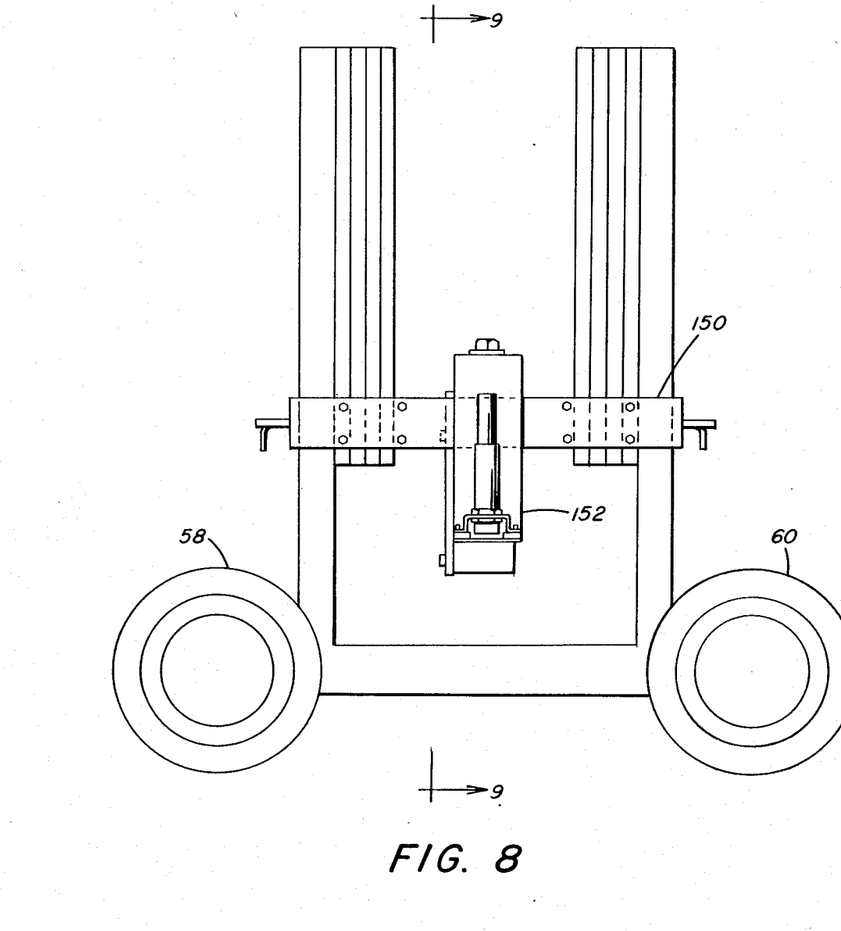
FIG. 8 is an alternate embodiment of the sliding frame of the present invention.
Figure 9:
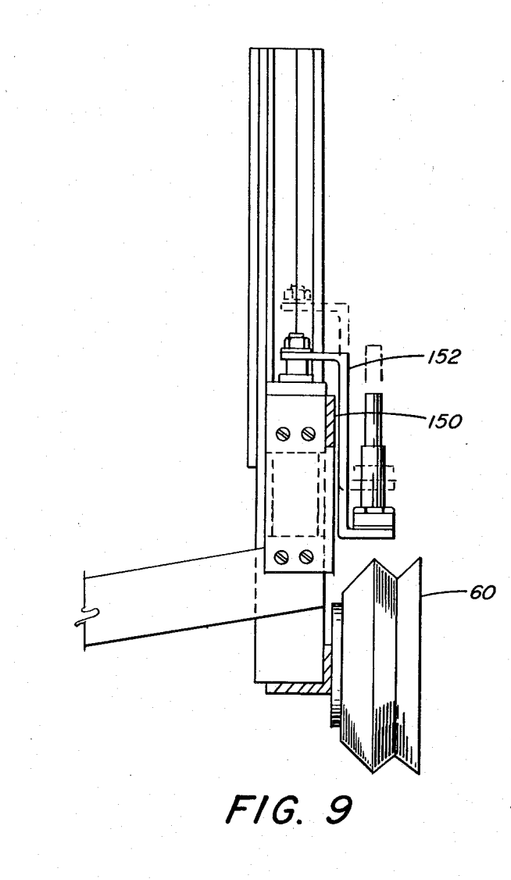
FIG. 9 is a view through line 9—9 of FIG. 8.

FIGS. 8 and 9 illustrate an alternate sliding frame 150 to handle smaller windshields. The sliding frame 150 is similar to the sliding frame 76 except that it does not have an upper vacuum cup 62. The proximity switch 126 is mounted to the air cylinder 120 via bent plate 152 for vertical movements as shown by the phantom lines on FIG. 9. The sliding frames 76 and 150 are easily interchangeable simply by sliding one frame off the tube members 72 and 74 and replacing it with the other frame.

Operating Sequence

Figure 10:
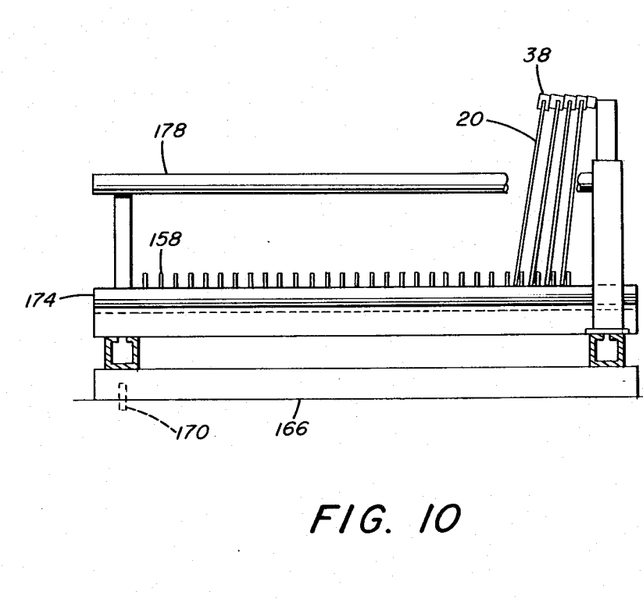
FIG. 10 is a view through line 10—10 of FIG. 1.
Figure 11:
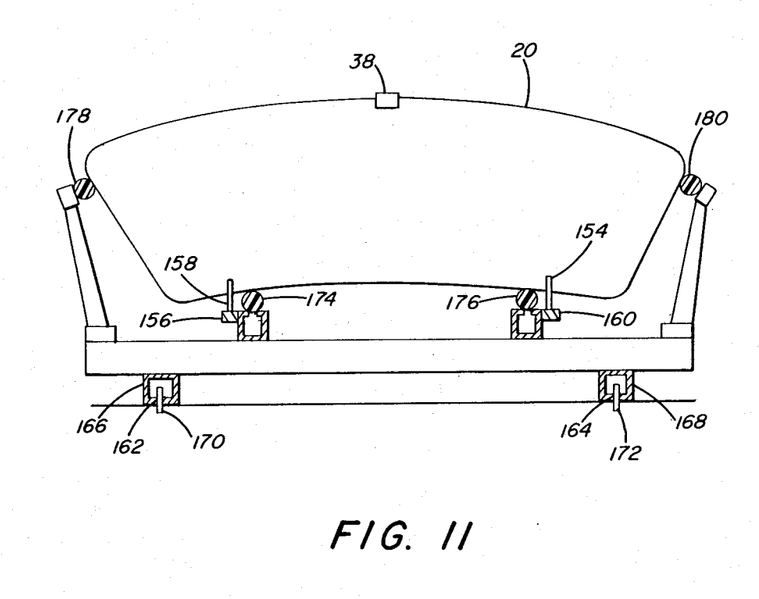
FIG. 11 is a view through line 11—11 of FIG. 1.

In the preferred embodiment of this invention the movement of the assembly 20 is controlled by a programmable controller 182 which links the upender conveyor 28, the windshield loading robot 32 and the spacer clip positioning dedicated robot (not shown). The position of the robot 32 relative to the upending conveyor 28 and the loading tubs 34 and 36 must be rigidly fixed and precise so that the movement of the end effector 40 on the robot 32 can be repeatable and precise within allowable tolerances. Although not limited to this invention, FIG. 10 illustrates a cross section of the preferred autoclave tub 34. The assemblies 20 with the clips 38 are positioned in a generally upright position, spaced at their lower edges by spacer pins 154 on strut 160 and spacer pins 158 on strut 156. The pins 154 and 158 are positioned at one spacer clip thickness apart so that the distance between adjacent upper edges of the assemblies 20 is the same as the distance between adjacent lower edges. The autoclave tub 34 can be fixably positioned relative to the robot 32 in a variety of methods. In the preferred embodiment, pin openings 162 and 164 in tub support rails 166 and 168 are located over pins 170 and 172, respectively, which are positioned in the floor to orient and locate the tub 34. The pins 170 and 172 are mounted in the floor at predetermined locations based on the reaching capacity of the robot 32. Each windshield 20 is positioned between adjacent spacer pins 154 and 158 and rests on lower runner bars 174 and 176, and between upper runner bars 178 and 180.

In actual practice, a Cincinnati MILACRON T³ six axis, hydraulic robot was used to position the end effector 40. The vacuum cups 58, 60 and 62 and air cylinder 120 are connected to air and vacuum sources through solonoid valves (not shown) in a manner well known in the art. In operation, the assembly 20 passes to the upender conveyor 28 where it is positioned upright on its lower edge. The spacer clip applying dedicated robot (not shown) places the spacer clip 38 on the assembly 20's upper edge. The robot 32 moves the end effector 40 to a position near the assembly 20 so that the vacuum cups 58, 60 and 62 can contact assembly 20, at which point a vacuum is drawn through the vacuum cups 58, 60 and 62 to engage the assembly 20. Vacuum indicators (not shown) indicate whether the vacuum drawn by each cup is sufficient to engage and support the assembly 20. At the same time, the air cylinder 120 which was originally in a first position as indicated by the phantom lines in FIG. 7, lowers the arm 122 and proximity switch 126 so as to engage and hold the spacer clip 38 in position. In this position, the proximity switch 126 senses if the spacer clip 38 is in position and transmits an alarm to the system operator in the event that the spacer clip 38 is missing. Although not limited in this invention, if the spacer clip 38 is missing, the robot 32 continues to loading the assembly 20 in the autoclave tub 34. The missing spacer clip 38 is manually positioned on the assembly 20 while in the autoclave tub 34 by a system operator. In the alternative, upon nondetection of the spacer clip 38, the robot 32 can stop and await further instruction or unload the assembly into a different tub.

The robot 32 and end effector 40 lifts the assembly 20 off the upender conveyor 28 and moves it through a pre-programmed path to the autoclave tub 34. The robot 32 next positions the assembly 20 between adjacent sets of the spacer pins 154 and 158 and lowers it onto the runner bars 174, 176, 178 and 180 at which time the programmable controller will instruct the vacuum cups 58, 60 and 62 to release their vacuum and disengage the assembly 20. As the robot 32 lowers the assembly 20 into position, the air cylinder 120 lifts the arm 122 and proximity switch 126 off of the spacer clip 38. The robot 32 then moves the end effector 40 back to the upender conveyor 28 to repeat the cycle. The programmable controller is programmed to instruct the robot 32 to index the unloading position of successive assemblies 20 back a distance equal to the width of one spacer clip 38.

There are additional sensors and safeguards that can be incorporated into the system. For example, sensors can be located at the upender conveyor 28 to indicate if the upended assembly 20 is in correct orientation and further to indicate when it has been removed by the robot 32.

As can now be appreciated from the foregoing description of the preferred embodiments the invention is not limited to that example which was presented for illustration purposes only. It is understood that other steps, examples, components, and methods of operation will occur to those skilled in the art from a thorough reading of this disclosure without departing from the scope of the invention as claimed hereafter.

I claim:

1. A method of loading windshield assemblies in an autoclave tub with a robot, said assemblies spaced apart by spacer clips positioned along an edge of each assembly comprising the steps of:
    temporarily engaging a spacer clip positioned on an edge of one of said assemblies to secure said spacer clip to said assembly;
    gripping said assembly;
    transferring said assembly to said tub;
    disengaging said spacer clip; and
    discontinuing said gripping step and releasing said assembly to deposit said assembly in said tub.

2. The method as described in claim 1, wherein said discontinuing and releasing step further includes depositing each successive assembly in said tub at a point one spacer clip thickness short of the point where the preceding assembly was deposited.

3. The method as described in claim 2, further including the step of maintaining a fixed spaced relationship between said robot and said autoclave tub.

4. The method as described in claim 1, further including the steps of:
   sensing whether said spacer clip is at a spacer clip position on said assembly; and
   automatically alerting an operator if said spacer clip is not sensed.

5. The method as described in claim 4, wherein said sensing step includes:
   positioning a proximity switch near said spacer clip position; and
   reading said proximity switch.

6. The method as described in claim 4 wherein said engaging step includes moving a clip retaining means to a first position where said clip retaining means contacts said spacer clip and further wherein said disengaging step includes moving said clip retaining means to a second position where said clip retaining means does not contact said spacer clip.

7. An end effector apparatus for attachment to an industrial robot for transferring windshield assemblies with spacer clips located on an edge of said assemblies comprising:
   a main frame with means to attach said main frame to said robot;
   gripping means positioned on said main frame to engage and secure said assemblies to said main frame;
   clip retaining means positioned on said main frame to temporarily secure said spacer clip to said assemblies;
   clip sensing means positioned on said main frame to sense if said clip is located on said assemblies; and
   means to control said robot in conjunction with said gripping means, clip retaining means, and clip sensing means wherein said clip retaining means secures said clip to said assemblies while said sensing means senses if said clip is one said assembly, said gripping means secures said assemblies to said end effector apparatus and said robot transfers said assemblies.

8. The apparatus described in claim 7, wherein said gripping means includes at least one suction member to engage a surface of said assemblies.

9. The apparatus as described in claim 7, further including a sliding frame slidably mounted to said main frame, and means to lock said sliding frame at various positions on said main frame.

10. The apparatus as described in claim 9, wherein said gripping means includes at least one suction member to engage a surface of said assemblies.

11. The apparatus as described in claim 10, wherein said clip retaining means includes a clip securing arm attached to an air cylinder mounted to said sliding frame, and positioned such that when said air cylinder is in a first position, said securing arm does not contact said clip, and when said air cylinder is in a second position, said securing arm contacts and holds said clip on said assembly.

12. The apparatus as described in claim 11, wherein said clip sensing means includes a proximity switch mounted on said sliding frame and positioned such that said switch is near said spacer clip when said assembly is engaged by said suction members.

13. The apparatus as described in claim 12, wherein said proximity switch is mounted on said clip securing arm such that when said air cylinder is in said second position and said arm contacts said clip, said proximity switch is in a position near said clip.

14. The apparatus as described in claim 13, wherein said gripping means includes at least one suction member attached to said sliding frame.

15. An end effector apparatus for attachment to an industrial robot for transferring windshield assemblies with spacer clips located on an edge of said assemblies comprising:
   a main frame with means to attach said main frame to said robot;
   sliding frame adjustably mounted to said main frame;
   gripping means positioned on said sliding frame to engage and secure said assemblies;
   clip retaining means positioned on said sliding frame to temporarily secure said spacer clip to said assemblies;
   clip sensing means positioned on said sliding frame to sense if said clip is located on said assemblies; and
   means to control said robot in conjunction with said gripping means, clip retaining means and clip sensing means wherein said clip retaining means secures said clip to said assemblies while said sensing means senses if said clip is on said assembly, said gripper means secures said assemblies to said end effector apparatus and said robot transfers said assemblies.

16. The apparatus as in claim 15 wherein said gripping means includes at least one suction member to engage a surface of said assemblies.

17. The apparatus as in claim 16 wherein said clip retaining means includes a clip securing arm attached to an air cylinder mounted to said sliding frame, and positioned such that when such air cylinder is in said first position, said securing arm does not contact said clip, and when said air cylinder is in said second position, said securing arm contacts and holds said clip on said assembly.

18. The apparatus as described in claim 17 wherein said clip sensing means include a proximity switch positioned such that said switch is near said spacer clip when said assembly is engaged by said suction member.

19. The apparatus as in claim 18 wherein said proximity switch is mounted on said clip securing arm such that when said air cylinder is in said second position and said arm contacts said clip, said proximity switch is in a position near said clip.

* * * * *